United States Patent
Kotecha

(10) Patent No.: US 7,929,636 B2
(45) Date of Patent: Apr. 19, 2011

(54) TECHNIQUES FOR REDUCING PRECODING OVERHEAD IN A MULTIPLE-INPUT MULTIPLE-OUTPUT WIRELESS COMMUNICATION SYSTEM

(75) Inventor: Jayesh H. Kotecha, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 809 days.

(21) Appl. No.: 11/838,029

(22) Filed: Aug. 13, 2007

(65) Prior Publication Data

US 2009/0046788 A1    Feb. 19, 2009

(51) Int. Cl.
*H04B 15/00*    (2006.01)
(52) U.S. Cl. .......................................... 375/285; 375/296
(58) Field of Classification Search .................. 375/285, 375/296
See application file for complete search history.

(56) References Cited

U.S. PATENT DOCUMENTS

| 2006/0209923 A1 | 9/2006 | Jin et al. | |
| 2008/0310353 A1* | 12/2008 | Love et al. | 370/329 |

FOREIGN PATENT DOCUMENTS

| EP | 1508992 A2 | 2/2005 |
| KR | 20040089748 A | 10/2004 |
| KR | 20070046755 A | 5/2007 |
| WO | 2006129958 A1 | 12/2006 |

OTHER PUBLICATIONS

International Search Report mailed Jan. 28, 2009 for coordinating PCT Application No. PCT/US2008/068030.
Samsung, "Downlink Signaling for Support of Single-User MIMO" R1-072250, 3GPP TSG RAN WG1 Meeting #49, May 7-11, 2007, pp. 1-3, Kobe, Japan.
Foschini, G. "Layered Space-Time Architecture for Wireless Communication in a Fading Environment When Using Multi-Element Antennas", Bell Labs Technical Journal, pp. 41-59, 1996.
Roh, W. et al. "Framework for Enabling Closed-Loop MIMO for OFDMA" IEEE C802.16e-04/552r3, Nov. 14, 2004.
Tong, W. et al. "A Codebook Addressing Approach to Reduce the Index Bit for MIMO Pre-Coding" IEEEC802.16e-05/064, pp. 1-2, Jan. 11, 2005.

* cited by examiner

*Primary Examiner* — Kevin Y Kim
(74) *Attorney, Agent, or Firm* — Dillon & Yudell LLP

(57) ABSTRACT

A technique of operating a wireless communication device in a multiple-input multiple-output wireless communication system includes receiving, at a first wireless communication device, recommended precoder information from a second wireless communication device, which is associated with a recommended precoder. A precoded signal is then formed at the first wireless communication device based on the recommended precoder or an alternate precoder. The first wireless communication device, which is configured to not provide an indication of whether the recommended precoder or the alternate precoder was utilized to form the precoded signal, then transmits the precoded signal.

13 Claims, 10 Drawing Sheets

TECHNIQUES FOR REDUCING PRECODING OVERHEAD IN A MULTIPLE-INPUT MULTIPLE-OUTPUT WIRELESS COMMUNICATION SYSTEM

BACKGROUND

1. Field

This disclosure relates generally to reducing overhead in a wireless communication system and, more specifically, to techniques for reducing preceding overhead in a multiple-input multiple-output wireless communication system.

2. Related Art

Today, multiple-input multiple-output (MIMO) systems, which employ multiple antennas at a transmitter and multiple antennas at a single receiver or one or more antennas at multiple receivers (depending on the implementation), are becoming increasingly common. Single-user MIMO systems implement multiple antennas at a transmitter and multiple antennas at a receiver. In contrast, multi-user MIMO systems employ multiple antennas at a transmitter and consider multiple receivers (each of which may have one or more antennas) as spatial resources, with each of the multiple receivers corresponding to at least one output. In general, MIMO wireless communication systems exhibit increased data throughput (due to higher spectral efficiency) and increased link range (due to reduced fading) without requiring additional bandwidth or transmit power, respectively (as contrasted with multiple-input single-output (MISO), single-input multiple-output (SIMO), and single-input single-output (SISO) wireless communication systems). MIMO wireless communication systems generally employ precoding, spatial multiplexing (SM), diversity coding, a combination of SM and precoding, or a combination of SM and diversity coding.

In SM (which can be employed with or without channel state information (CSI) at a transmitter), an original signal is split into multiple lower-rate streams and each stream is transmitted from a different transmit antenna in the same frequency band. When the transmitted streams arrive at a receiver antenna array with sufficiently different spatial signatures, a MIMO receiver can readily separate the transmitted streams into parallel channels that exhibit increased signal-to-noise ratio (SNR), as compared to the original signal when transmitted as a single higher-rate stream.

Precoding employs beamforming to support multi-layer communications. Precoding normally utilizes knowledge of CSI at a transmitter in an attempt to maximize received signal levels at all antennas of a receiver. Precoding can be generally defined as a transformation applied to the transmitted data before the transmission, typically to align the transmission to the channel in some form to maximize a performance metric like signal-to-noise ratio (SNR). Precoding, in general, can be a linear or non-linear transformation. In linear preceding, the transformation can be equivalently applied in the form of a matrix to the transmitted vector symbol on the multiple antennas. Typically, some form of channel knowledge is used at the transmitter to choose an appropriate precoder. In some cases, a receiver feeds back information about the channel or the precoder to a transmitter. Codebook based preceding is a special case of precoding and, in some cases, a preferred or recommended precoder is chosen from a set of known precoders (known as a codebook) with each precoder in the set being associated with an index, which is fed back to the transmitter as a means for feedback reduction. In general, precoding can be applied to transmit single or multiple MIMO streams to a single user (single-user MIMO) or multiple users (multi-user MIMO).

MIMO wireless communication systems are known that have fed-forward (or contemplated feeding-forward) preceding information in the form of control bits or precoded pilot signals from a BS to an SS to explicitly signal to the SS what precoder the BS employed in a MIMO transmission.

Precoding may be employed in orthogonal frequency division multiplexing (OFDM) systems, which typically support relatively high data rate wireless transmission using orthogonal channels that offer immunity against fading and inter-symbol interference (ISI) without requiring implementation of elaborate equalization techniques. Typically, OFDM systems split data into N streams, which are independently modulated on parallel spaced subcarrier frequencies or tones. The frequency separation between subcarriers is 1/T, where T is the OFDM symbol time duration. Each symbol may include a guard interval (or cyclic prefix) to maintain the orthogonality of the symbols. Normally, OFDM systems have utilized an inverse discrete Fourier transform (IDFT) to generate a sampled (or discrete) composite time-domain signal.

Various wireless networks, such as third-generation partnership project long-term evolution (3GPP-LTE) and IEEE 802.16 (also known as worldwide interoperability for microwave access (WIMAX)) compliant architectures employ a scheduler (included within or coupled to a serving base station (BS)) that utilizes information derived from channel characterization to determine channel allocation for served user equipment (subscriber stations (SSs)). In a 3GPP-LTE compliant system, channel allocation, e.g., uplink and downlink assignments, is provided to SSs over a downlink shared control channel (physical downlink control channel (PDCCH)), which typically includes one or more control channel symbols. The one or more control channel symbols are usually transmitted by a serving BS at a beginning of a downlink subframe. Typically, upon receiving the one or more control channels symbols, each of the SSs searches (using, for example, a blind search procedure) the one or more control channel symbols to locate an associated downlink and uplink control channel to determine respective downlink and uplink assignments.

With reference to FIG. 1, a functional block diagram 100 of a relevant portion of a conventional multiple-input multiple-output (MIMO) wireless communication system 100, which may be 3GPP-LTE compliant, is depicted. The system 100, which may be configured to operate in a single-user MIMO mode or a multi-user MIMO mode, includes a base station (BS) 102 that is in communication with a subscriber station (SS) 142. As is depicted, the BS 102 includes a scheduler 104, a BS precoder (preceding codeword (CW)) codebook (CB) 106, a precoder selector 108, a control field generator 110, and a transmitter 112. The BS 102 may also employ an SS CB 116 that is coupled to the scheduler 104, when the BS precoder CB 106 is not the same as SS CB 152 (included in the SS 142). As is logically shown, the scheduler 104 receives feedback (FB) from the SS 142 that corresponds to a recommended precoder (preceding CW) selected by the SS 142. The FB from the SS 142 may correspond to a CB index, e.g., an SS CB index or a channel vector quantizer (CVQ) CB index.

When the FB corresponds to a CB index, the scheduler 104 utilizes the CB index (unless the scheduler 104 decides to override the recommended precoder) to select an appropriate precoder from the BS precoder CB 106. The selected precoder is passed by the scheduler 104 to the precoder selector 108, which provides a CB index for the selected precoder to the control field generator 110 and the selected precoder to the transmitter 112, which includes multiple antennas 114. The control field generator 110 positions the CB index in a protocol dependent field of, for example, an associated downlink control channel of the SS 142 (which is included in a downlink shared control channel) or in another location in the downlink shared control channel to feed-forward (FF) the selected CB index to the SS 142.

The SS 142 includes a control channel decoder 144, a preceding CW decoder 146, a receiver 148, a channel estimator 150, the SS CB 152 (which may include a channel vector quantizer (CVQ) CB or a precoder CB), and a precoder selector 154. The SS 142 may also employ a BS CB 158, which is coupled to the precoding CW decoder 146, when the BS precoder 106 is not the same as the SS CB 152. The control channel decoder 144, for example, decodes an associated downlink control channel of the SS 142 to retrieve a CB index (which is fed-forward from the BS 102 in the downlink shared control channel) and provides the CB index to the precoding CW decoder 146, which provides a single CW (i.e., 'W') to the receiver 148 based on the CB index, irrespective of whether the SS CB 152 is a precoder CB or a CVQ CB. The receiver 148, which is coupled to one or more antennas 156, utilizes the preceding CW to process a received signal. As is shown, the receiver 148 is coupled to the channel estimator 150, which estimates a channel quality of a received signal and provides a channel estimation (i.e., 'H') to the precoder selector 154, which selects a recommended precoder (precoding CW) or a CVQ from the SS CB 152 responsive thereto. The precoder selector 154 also provides the FB (which may be in the form of a CB index) to the scheduler 104 (of the BS 102) in a protocol dependent location in an assigned uplink (JL) to indicate the recommended precoder.

With reference to FIG. 2, a flowchart of a conventional process 200, which feeds-forward precoding information to the SS 142 and is employed in the BS 102 when the system 100 is configured in single-user MIMO mode, is depicted. In block 202 the process 200 is initiated, at which point control transfers to block 204 where the BS 102 receives feedback (FB), which corresponds to a CB index of a recommended precoder, from the SS 142. Next, in decision block 206, the BS 102 makes a determination at to whether the recommended precoder should be overridden. When the BS 102 decides to override the FB in block 206, control transfers to block 208 where a non-recommended precoder is selected (from the BS precoder CB 106) by the BS 102 for a transmission. In block 206, when the BS 102 decides not to override the FB, control transfers to block 210 where the recommended precoder is selected for the transmission. Following blocks 208 and 210, control transfers to block 212 where precoding information (e.g., in the form of control bits or precoded pilot signals) are fed-forward in the transmission from the BS 102 to the SS 142. Following block 212, control transfers to block 214 where control returns to a calling routine.

With reference to FIG. 3, a flowchart of another conventional process 300, which feeds-forward preceding information to the SS 142 and is employed in the BS 102 when the system 100 is configured in multi-user MIMO mode, is depicted. In block 302 the process 300 is initiated, at which point control transfers to block 304 where the BS 102 receives feedback (FB), which corresponds to a CVQ CB index, from the SS 142. Next, in decision block 306, the BS 102 determines whether to override the FB provided by the SS 142. When the BS 102 decides to override the FB, control transfers from block 306 to block 308. In block 308, a non-recommended precoder is selected (from the BS precoder CB 106) by the BS 102 for a transmission. In block 306, when the BS 102 decides not to override the FB, control transfers to block 310 where the BS 102 uses the CVQ CB index to choose a precoder from a subset of precoders (which may include one or more precoders depending on the system configuration) indicated by the CVQ CB index for the transmission. Following blocks 308 and 310, control transfers to block 312 where preceding information (e.g., in the form of precoded control bits or precoded pilot signals) is fed-forward in the transmission from the BS 102 to the SS 142. Following block 312, control transfers to block 314 where control returns to a calling routine.

With reference to FIG. 4, a flowchart of yet another conventional process 400, which receives fed-forward preceding information from the BS 102 and is employed in the SS 142 when the system 100 is configured in single-user or multi-user MIMO mode, is depicted. In block 402, the process 400 is initiated, at which point control transfers to block 404, where the SS 142 receives a transmission from the BS 102. Next, in block 406, the SS 142 identifies a precoder associated with the transmission from a CB based on the CB index included in the transmission. Then, in block 408, the transmission is decoded with the identified precoder. Following block 408, control transfers to block 410 where control returns to a calling routine.

In the above-described techniques, precoding information (i.e., a CB index for a preceding codeword) for a multiple input multiple output (MIMO) transmission is explicitly fed-forward (FF) from a serving BS to an SS to advise the SS as to the precoder that was utilized for the transmission. In this case, the preceding information is compared with preceding information recommended by the SS to determine whether a recommended precoder was utilized by the SS. While the approach provides certainty as to what precoding CW a serving BS has employed in preceding a transmission, feeding forward the precoding information from the BS to the SS is not without cost, as a number of bits (e.g., three to five bits depending on the number of SSs assigned to a resource block (RB)) may be employed for each MIMO RB allocated. While the number of bits may be reduced to, for example, one bit (which may be used to indicate whether the recommended precoder was utilized or not for the RB) for each MIMO RB, feeding-forward one bit for each MIMO RB may still result in unacceptable preceding overhead when the number of MIMO RBs is relatively large.

What is needed are techniques for reducing preceding overhead in a multiple-input multiple-output wireless communication system.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

In the following detailed description of exemplary embodiments of the invention, specific exemplary embodiments in which the invention may be practiced are described in sufficient detail to enable those of ordinary skill in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although various embodiments are described below in conjunction with a subscriber station, such as a cellular handset, it will be appreciated that the present invention is not so limited and may be embodied in various devices, e.g., personal digital assistants (PDAs), digital cameras, portable storage devices, audio players, computer systems, and portable gaming devices, for example.

As is used herein, the term "user equipment" is synonymous with the term "subscriber station," which is used to broadly denote a wireless device associated with a wireless communication system. As used herein, the term "control channel symbol" includes a symbol that occupies a channel, which may occupy an entire system bandwidth or a portion of the entire system bandwidth. The term "channel," as used herein, includes one or more subcarriers, which may or may not be adjacent. As may be used herein, the term "slot" refers to a symbol location in a multiple access signal. The term "blind search procedure" is used herein to refer to a search procedure in which a searcher, e.g., a subscriber station (SS), has no prior knowledge of a location of an item searched for in a sequence of items. For example, when an SS is searching one or more control channel symbols (of a downlink shared control channel) for an associated control channel, the SS does not have prior knowledge of the location of the associated control channel in the one or more control channel symbols when a blind search procedure is employed.

Figure 10:
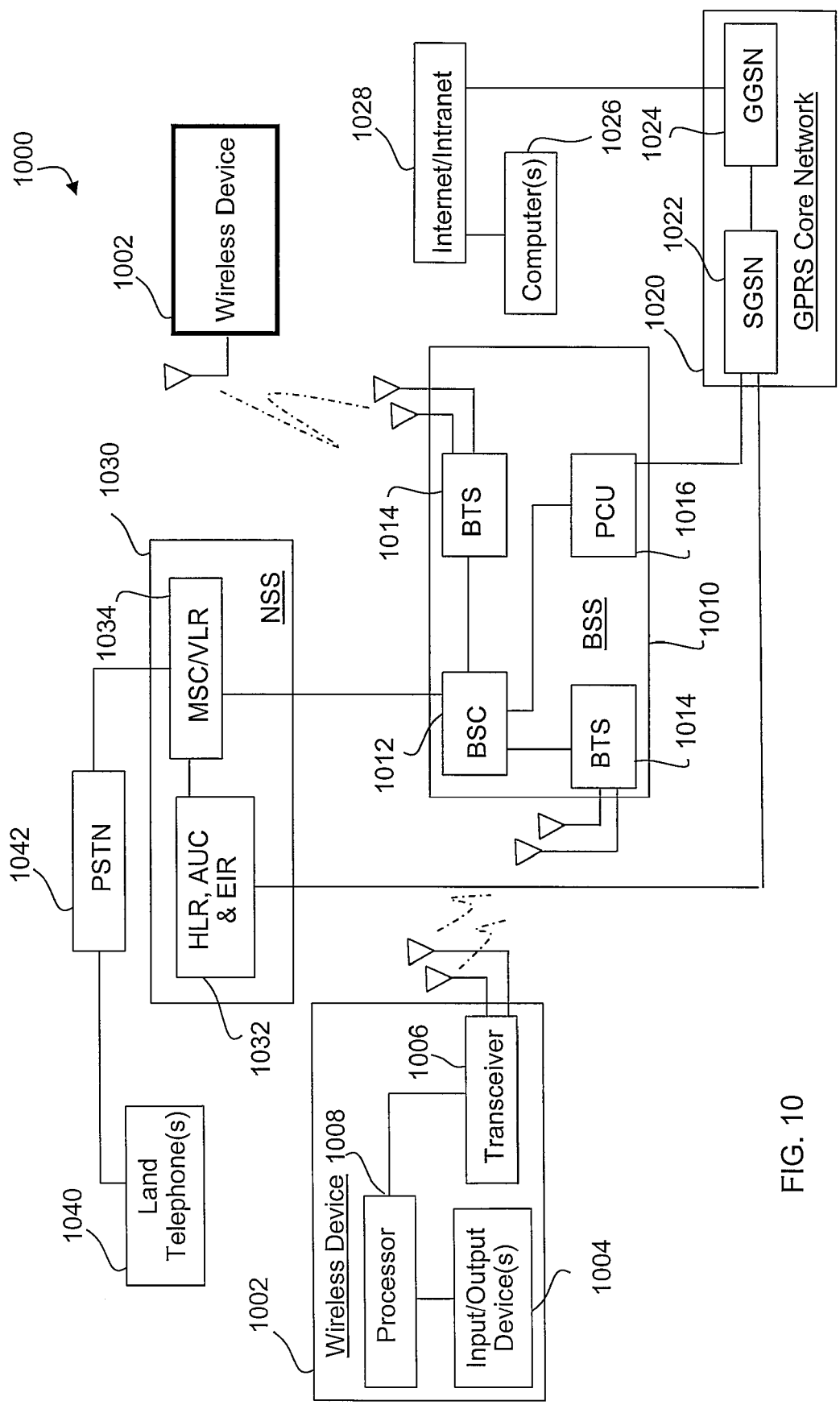
FIG. 10 is a block diagram of an example MIMO wireless communication system that may operate without feeding-forward precoding information from a serving BS to an SS

In a typical multiple-input multiple-output (MIMO) wireless communication system configured according to one or more embodiments of the present disclosure, a scheduler associated with a serving BS (e.g., a network scheduler (included in base station controller (BSC) 1012 of FIG. 10) or a scheduler located at a base transceiver station (BTS) 1014 of FIG. 10) may be configured to schedule a control channel format indicator (CCFI) in a downlink shared control channel (physical downlink control channel (PDCCH)) to indicate a size, e.g., in symbols, of the downlink shared control channel. For example, in a MIMO wireless communication system that may transmit up to three symbols in a downlink shared control channel, the CCFI may include two bits that are repeated twelve times in a first symbol of the downlink shared control channel in a protocol dependent location. The control channel symbols may be, for example, orthogonal frequency division multiplexing (OFDM) signals. An associated control channel of an SS (included in the downlink shared control channel) may include one or more control channel elements that provide various control information to the SS. The associated control channel may be a downlink control channel, an uplink control channel, or a combined control channel that includes both uplink and downlink assignment information.

In a typical MIMO wireless communication system, a downlink (DL) shared control channel is located at a beginning of a DL subframe that may include multiple DL shared control channel symbols (e.g., one, two, or three control channel symbols) and multiple data symbols. The control channel symbols typically include a number of control channel elements (CEs), each of which include a number of subcarriers, e.g., six subcarriers. Similarly the data symbols each include a number of resource blocks (RBs), with each of the RBs including, for example, twelve subcarriers. It should be appreciated that the CEs and the RBs may have the same size or a different size. It should also be appreciated that the techniques disclosed herein are broadly applicable to DL subframes of varying sizes and that a control channel symbol may assume an integer value or a fractional value. The associated DL control channel may be identified by an SS when, for example, a unique identifier (e.g., a unique 16-bit identifier) included in a protocol dependent field within the associated DL control channel corresponds to the unique identifier assigned (by, for example, a network administrator) to the SS. The SS may use an SS identification (ID) to determine which RBs are assigned to the SS using information in, for example, an SS specific RB map or an RB map provided in a shared RB mapping channel.

In a typical wireless communication system, the number of implemented RBs is based on a bandwidth of the system. For example, in a wireless communication system that has a 20 MHz bandwidth, one-hundred RBs (corresponds to twelve-hundred subcarriers in a system that defines an RB as including twelve subcarriers) may be utilized. As another example, in a wireless communication system that has a 10 MHz bandwidth, fifty RBs may be utilized. As yet another example, in a wireless communication system that has a 5 MHz bandwidth, twenty-five RBs may be utilized. In a typical implementation, an SS may read one or more entries in an RB map to determine whether the SS is to receive downlink information in the associated RB.

In a typical wireless communication system, a scheduler is configured to schedule the associated DL control channels for each of the SSs that the scheduler is attempting to serve. The scheduler may be configured to schedule a shared RB mapping channel in the DL shared control channel. In this case, the shared RB mapping channel is sized based on a system bandwidth and includes a single RB map that is utilized by all of the served SSs to determine associated DL RBs (i.e., where a given one of the SSs is to receive DL information). In the above embodiment, each of the SSs receives the shared DL control channel and decodes the CCFI to determine a candidate set (i.e., the number of symbols that are required to be searched) for a search procedure (e.g., a blind search procedure) of the shared DL control channel. Each of the SSs is configured to detect an associated control channel (indicated by, for example, a unique identifier associated with an SS) in the candidate set and may be configured to detect an associated SS identification (ID) from the associated control channel. Each of the SSs may also be configured to use the associated SS ID in conjunction with an RB map (included in a shared RB mapping channel) to detect one or more associated RBs. Alternatively, an SS specific RB map may be included within an associated control channel of the SS.

It should be appreciated that each of the associated DL control channels of an SS may include additional information, e.g., in protocol dependent fields. For example, the additional information may include a hybrid automatic repeat request (HARQ) field, a multiple input multiple output (MIMO) field, among other fields. Alternatively, MIMO information may be provided to SSs in a shared MIMO channel. Transmitters implemented within a wireless communication system, configured according to various embodiments of the present disclosure, may transmit information using a phase shift keying (PSK), a quadrature amplitude modulation (QAM), or other data modulation scheme, depending upon which modulation scheme is scheduled. For example, any of the various PSK (such as pi/2 BPSK, QPSK, and 8-PSK), or QAM (such as 16-QAM and 64-QAM) modulation techniques may be implemented.

A shared multiple input multiple output (MIMO) control channel may be employed to reduce scheduling overhead. In this case, entries in a shared MIMO control channel may be associated with respective RBs of the transmission channel, which may be arranged in a predefined index sequence. Alternatively, entries in a shared MIMO control channel may be associated with entries in a shared resource block (RB) mapping channel. An SS may be configured to first decode an associated control channel to determine an RB assignment and non-MIMO related control information. In this case, the SS may then utilize the RB assignment to decode RB specific MIMO control information for each assigned RB. The MIMO control information (e.g., assigned layer information, transmission rank information) for each RB may be encoded in a shared MIMO control channel, whose sequence corresponds to a predefined index sequence or a sequence utilized in an RB map provided in a shared RB mapping channel. When the MIMO control information is mapped according to a predefined index sequence or the RB map sequence, the number of bits required to provide MIMO control information to an SS is generally reduced. For RBs that do not utilize a MIMO mode (e.g., RBs that utilized SIMO mode and are not precoded), an indicator may be transmitted in the RB map that indicates an associated RB is not a MIMO RB.

According to various aspects of the present disclosure, a number of techniques for reducing precoding overhead in a multiple-input multiple-output (MIMO) wireless communication system are described herein. According to various aspects of the present disclosure, precoding matrix feed-forward overhead is eliminated by constraining the choices of precoding matrices a base station (BS) (or more broadly, a transmitter) can use. When a BS decides to override a precoder recommendation of the SS or feedback (including the precoder recommendation) from the SS is received in error (such that the BS is unaware of the precoder recommendation), the BS uses an alternate precoder (which may be an identity matrix) or one of multiple alternate precoders known to the SS. When the BS does not override the feedback from the SS, the disclosed techniques eliminate the need for any downlink overhead for preceding information feed-forward, albeit at the expense of SS complexity and possible performance loss. In general, performance loss is greater when the BS overrides the recommended precoder. While the discussion herein is directed to communication between a transmitter in a BS and a receiver in an SS, it is contemplated that the techniques disclosed herein are broadly applicable to communication between a receiver and a transmitter irrespective of the location of the transmitter and the receiver.

Due to the fact that the BS infrequently overrides the recommended precoder, any performance loss is relatively small. In general, the override mechanism is known both to the BS and the SS (a priori) and, thus, feed-forward signaling is implicit. According to this approach, a BS transmits MIMO data stream(s) with the alternate precoder in the override case. In general, each SS is configured to decode MIMO control information (or other designated control information) and detect a transmission precoder assuming the possibility of override with an alternate precoder. The transmission decoder is then utilized to decode assigned precoded packets (e.g., RBs). It should be appreciated that the alternate precoder or multiple alternate precoders and the recommended precoder are known to both the transmitter and the receiver a priori.

To reiterate, the disclosed techniques reduce precoding overhead by not feeding-forward preceding information from a BS to an SS, or more broadly from a transmitter to a receiver. As compared to known techniques for signaling precoding information from a BS to an SS, the techniques disclosed herein reduce precoding overhead by at least one bit for each MIMO precoded packet, albeit at the cost of slightly increased complexity in the SS. In general, the increased complexity is attributable to hypothesis testing of multiple known precoders (e.g., a recommended precoder and an alternate precoder) that may have been utilized by a serving BS in transmission preceding. In one or more embodiments, the alternate precoder may take the form of an identity matrix, which equates to an open loop system where a serving BS is not receiving any feedback (as to a recommended precoder) from a served SS.

According to one embodiment of the present disclosure, a technique of operating a wireless communication device in a multiple-input multiple-output (MIMO) wireless communication system includes receiving, at a first wireless communication device, recommended precoder information, which is associated with a recommended precoder, from a second wireless communication device. A precoded signal is formed at the first wireless communication device based on the recommended precoder or an alternate precoder. The first wireless communication device, which is configured to not provide an indication of whether the recommended precoder or the alternate precoder was utilized to form the precoded signal, then transmits the precoded signal.

According to another embodiment of the present disclosure, a technique for operating a wireless communication device in a MIMO wireless communication system includes receiving a precoded signal. The technique also includes hypothesis testing the precoded signal to determine whether a recommended precoder or an alternate precoder was utilized in forming the precoded signal.

According to another aspect of the present disclosure, a wireless communication system includes a subscriber station (SS) and a base station (BS) that is in communication with the SS. The BS is configured to receive, from the SS, recommended precoder information, which is associated with a recommended precoder. The BS is also configured to form a precoded signal based on the recommended precoder or an alternate precoder. The BS is further configured to transmit the precoded signal without providing an indication of whether the recommended precoder or the alternate precoder was utilized to form the precoded signal.

Figure 1:
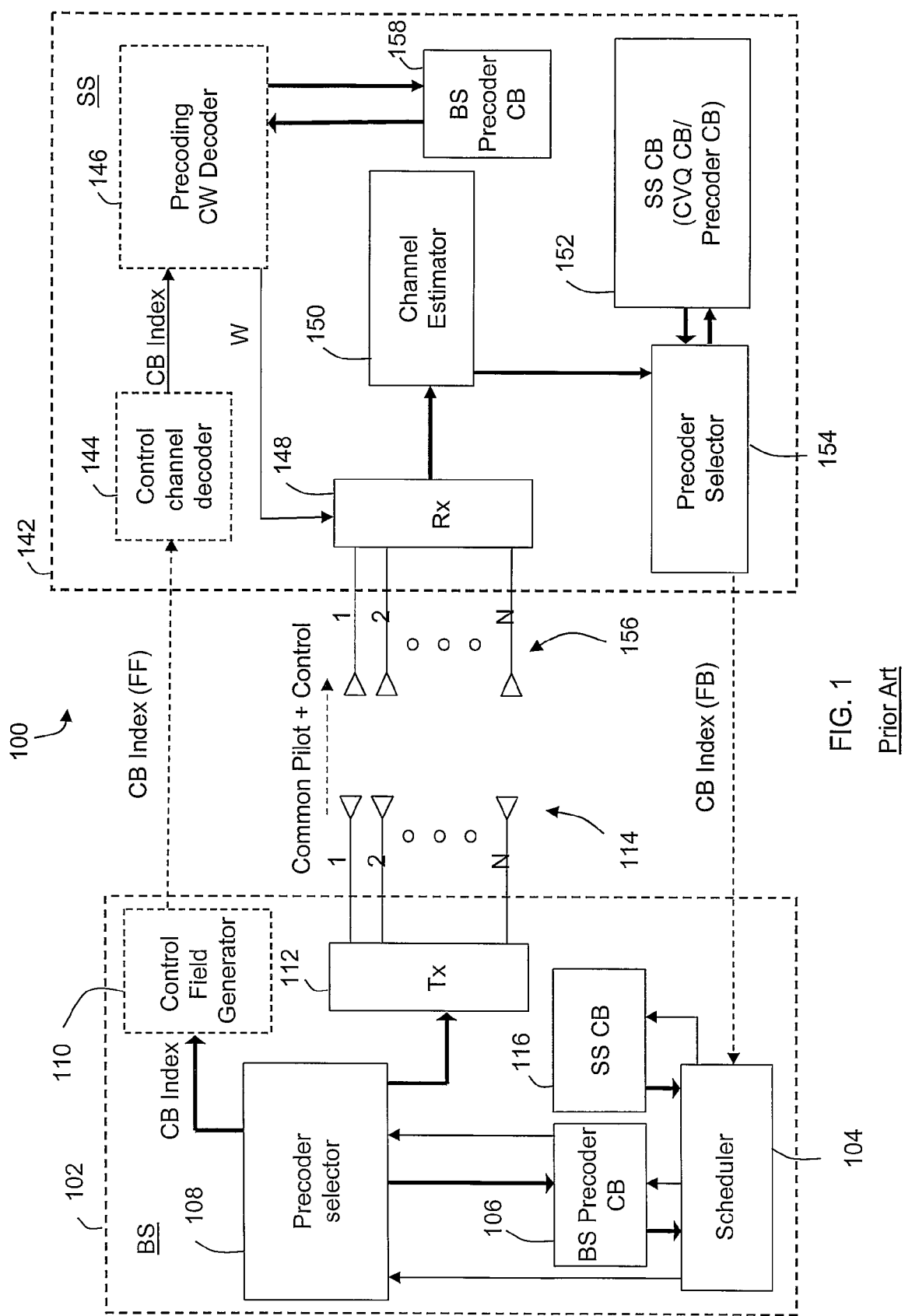
FIG. 1 is an example functional block diagram 100 of a relevant portion of a conventional multiple-input multiple-output (MIMO) wireless communication system that feeds-forward precoding information from a base station (BS) to a subscriber station (SS).
Figure 2:
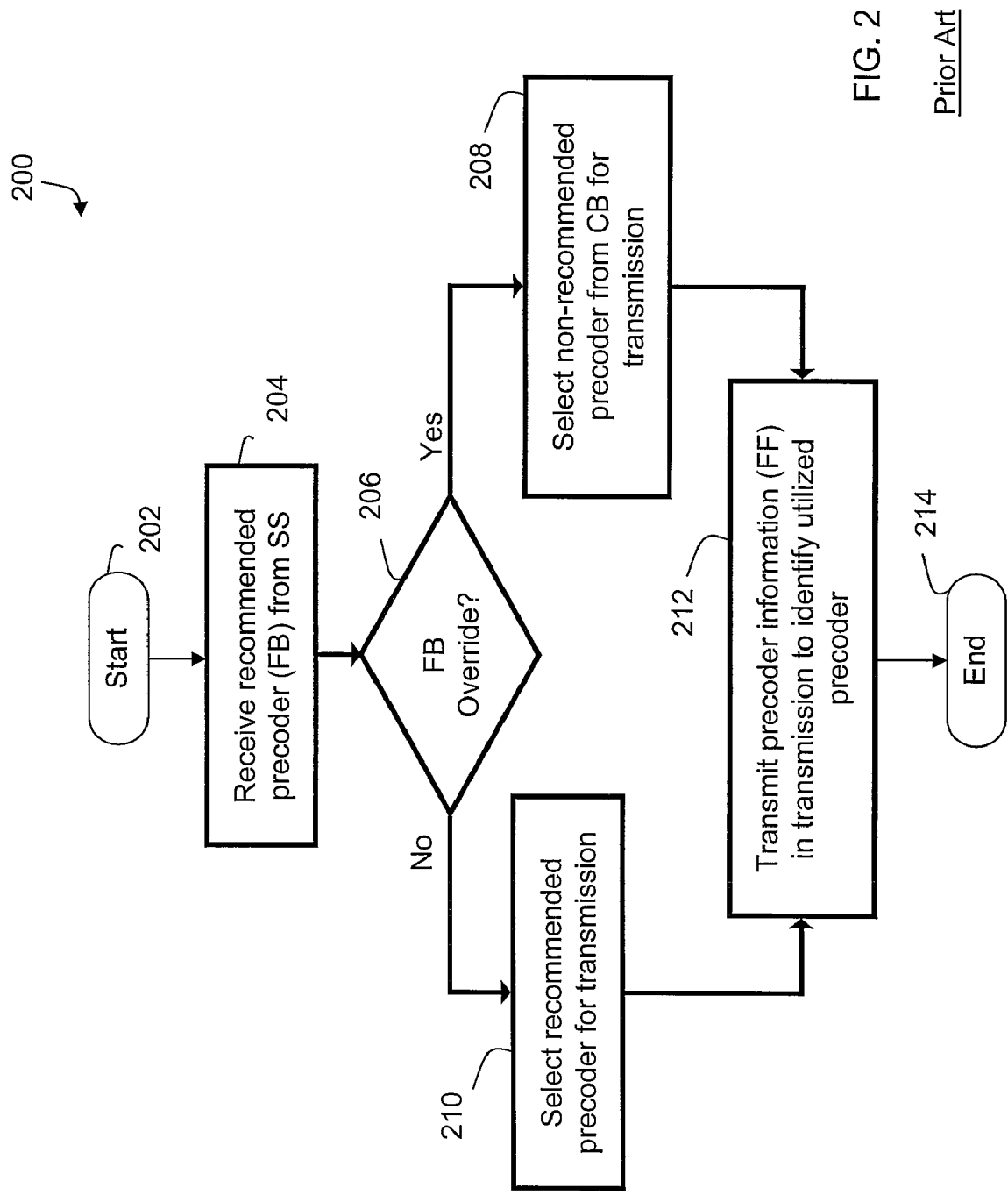
FIG. 2 is a flowchart of a conventional process employed in a BS of a single-user MIMO wireless communication system that feeds-forward precoding information to an SS.
Figure 3:
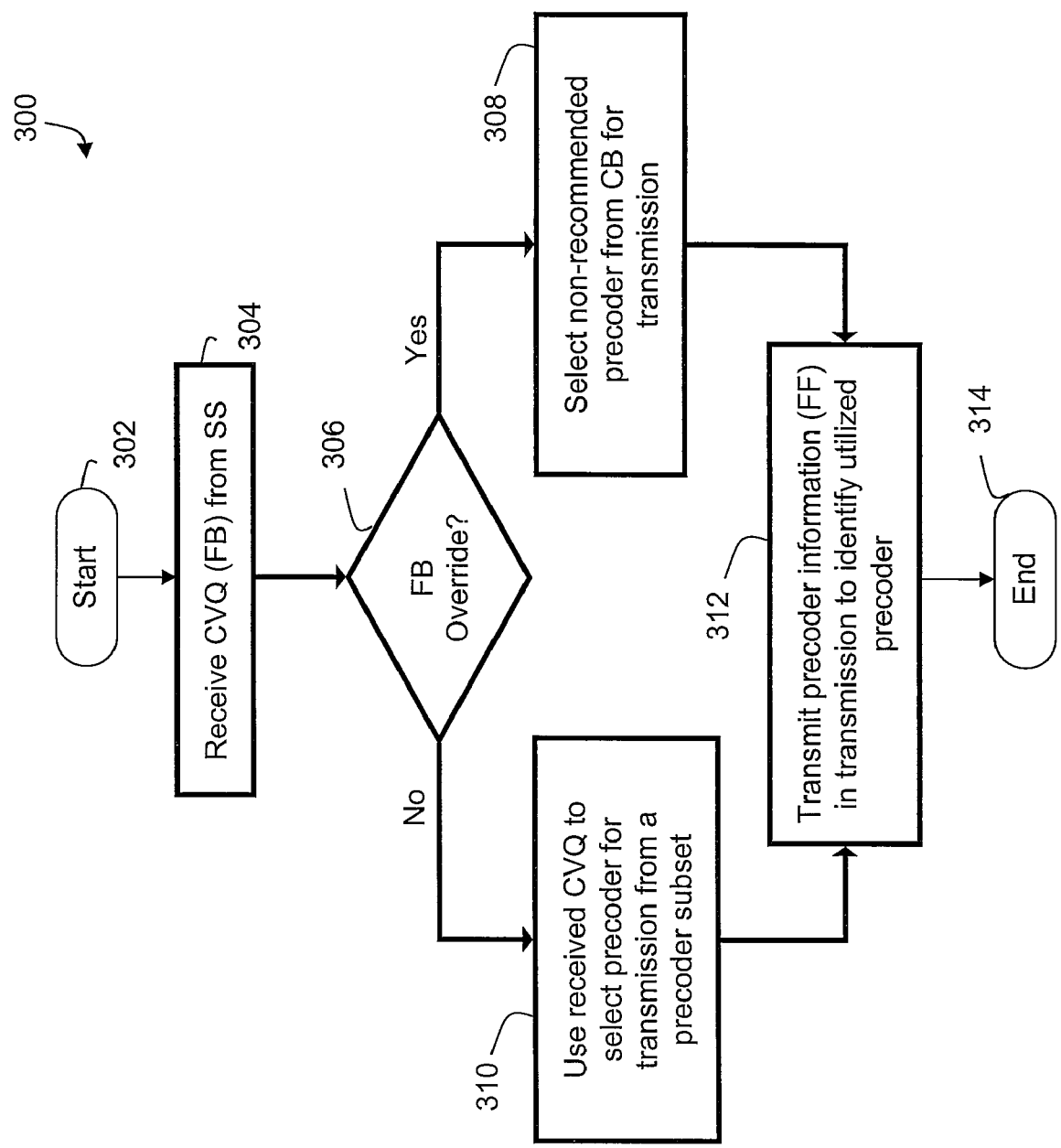
FIG. 3 is a flowchart of a conventional process employed in a BS of a multi-user MIMO wireless communication system that feeds-forward precoding information to an SS.
Figure 4:
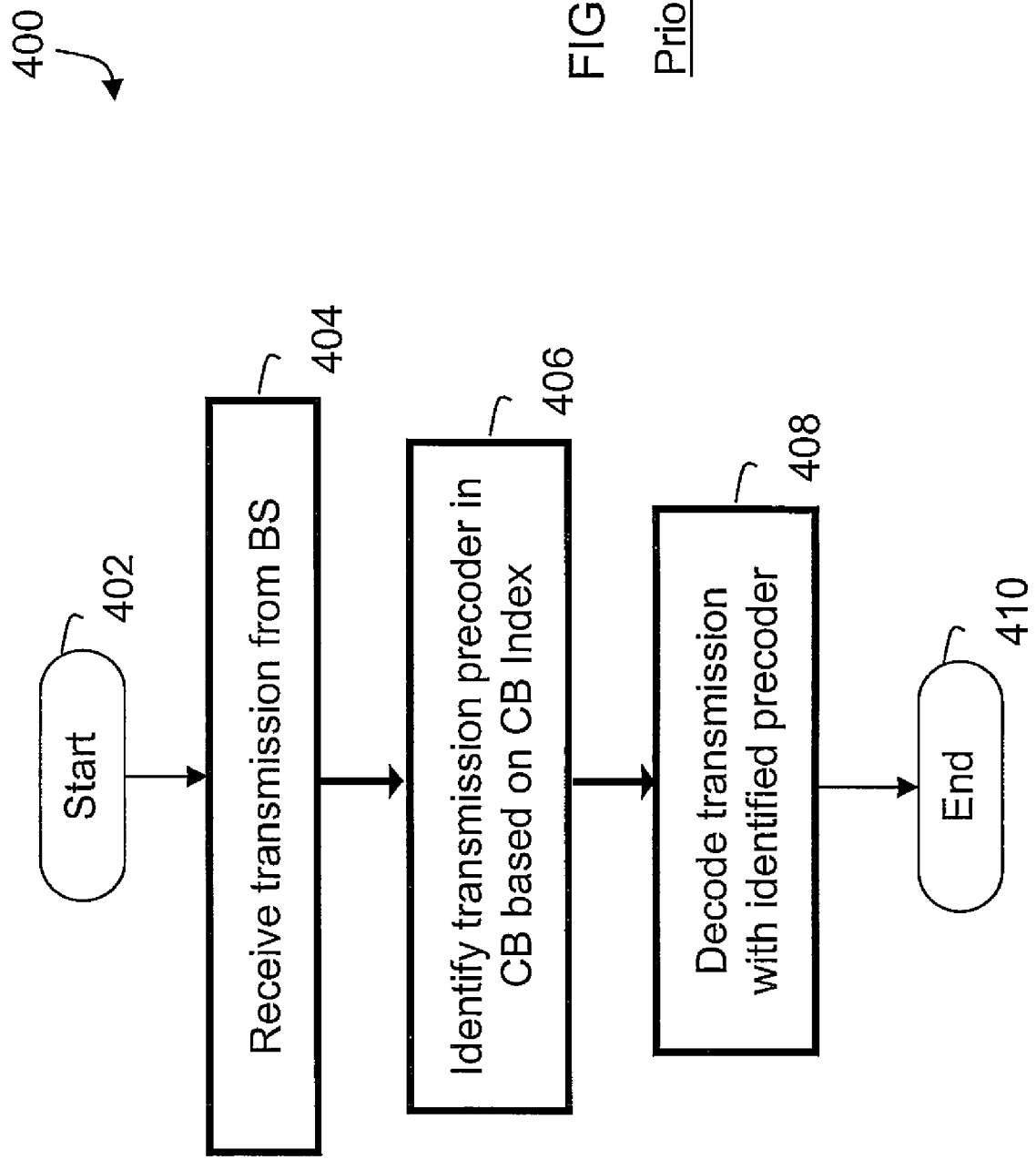
FIG. 4 is a flowchart of a conventional process employed in an SS of a single-user or a multi-user MIMO wireless communication system that identifies a transmission precoder, utilized by a serving BS, from precoding information that has been fed-forward from the BS.
Figure 5:
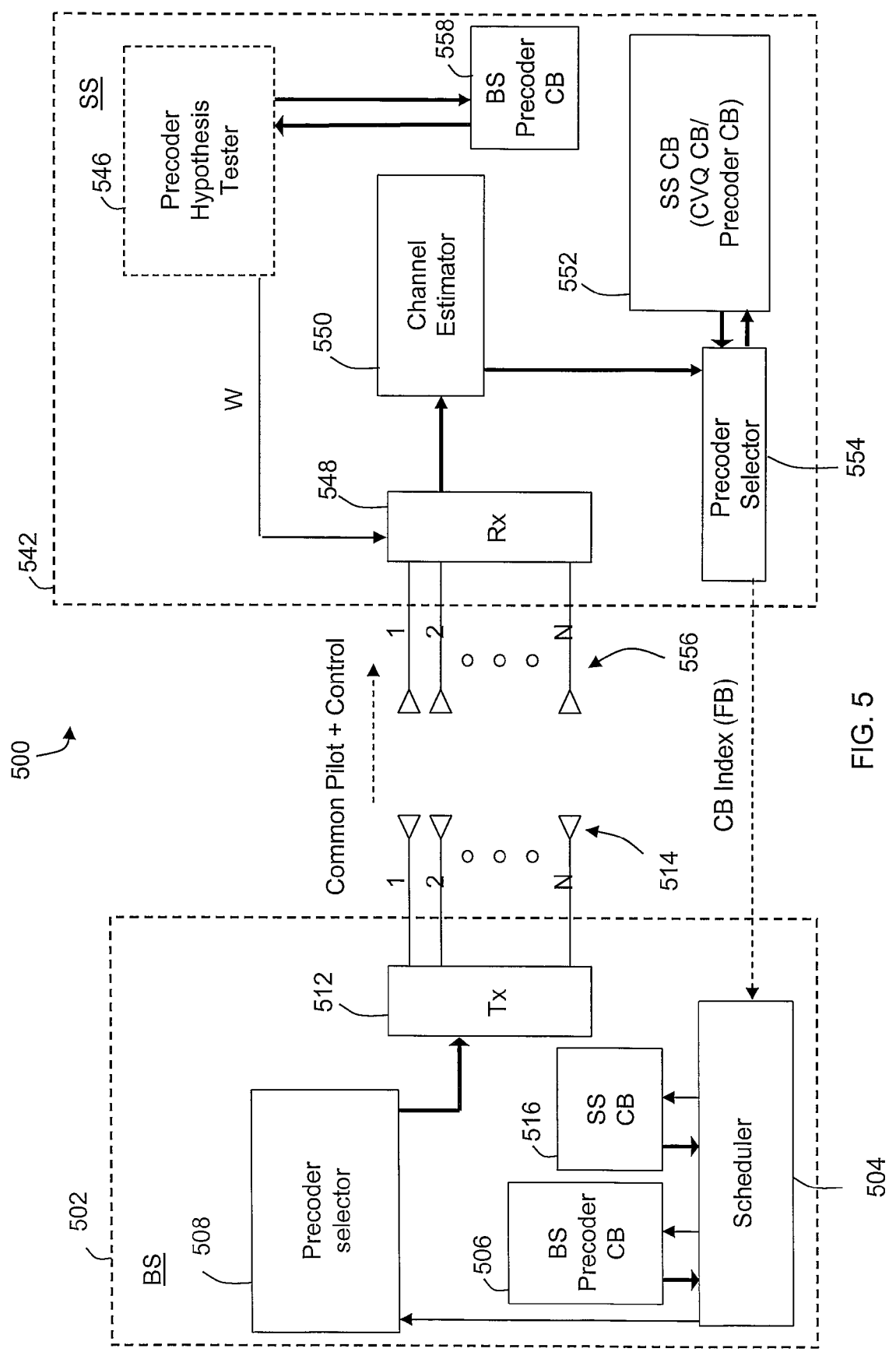
FIG. 5 is an example functional block diagram of a relevant portion of a MIMO wireless communication system, configured according to various aspects of the present disclosure, that does not feed-forward precoding information from a BS to a served SS.

With reference to FIG. 5, a functional block diagram of a relevant portion of a multiple-input multiple-output (MIMO) wireless communication system 500, which is configured according to the present disclosure, is depicted. The system 500, which may be configured to operate in a single-user MIMO mode or multi-user MIMO mode, includes a base station (BS) 502 that is in communication with a subscriber station (SS) 542. As is depicted, the BS 502 includes a scheduler 504, a BS precoder codebook (CB) 506 (which includes multiple preceding codewords (CWs)), a precoder selector 508, and a transmitter 512, which includes multiple antennas 514 (e.g., two to four antennas). The BS 502 may also employ an SS CB 516 (which corresponds to SS CB 552 in the SS 542) that is coupled to the scheduler 504, when the BS precoder CB 506 and the SS CB 552 are different. In one embodiment (e.g., in single-user MIMO mode), the SS CB 552 and BS precoder CB 506 are identical. In another embodiment (e.g., multi-user MIMO mode), the SS CB 552 and the BS precoder CB 506 are not identical and BS precoder CB 558 (which corresponds to the BS precoder CB 506) is also employed in the SS 542. In either case, feedback (FB) from the SS 542 to the scheduler 504 corresponds to a single precoder or multiple precoders.

The scheduler 504 utilizes the FB (unless the scheduler 504 decides to override the recommended precoder) to select an appropriate CW, which may be, for example, located in one or more look-up tables. The selected precoder is passed by the scheduler 504, via the precoder selector 508, to the transmitter 512. The transmitter 512 utilizes the selected precoder to encode one or more transmitted MIMO streams to the SS 542. The allocation of RBs for the SS 542 is provided in a downlink shared control channel, which may also include other control signals.

The SS 542 includes a precoder hypothesis tester 546, a receiver 548 (e.g., a minimum mean square error (MMSE) receiver), a channel estimator 550, the SS CB 552 (which may include a channel vector quantizer (CVQ) CB or a precoder CB), and a precoder selector 554. The SS 542 may also employ the BS precoder CB 558 (which, when implemented, corresponds to the BS precoder CB 506) coupled to the precoder hypothesis tester 546, when the CBs (506 and 552) in the BS 502 and the SS 542 are different. When employed, the CVQ CB corresponds to a codebook of vectors to which a vector channel can be quantized. In CVQ feedback, an SS quantizes its equivalent vector channel according to the CVQ CB, so that the feedback to the BS provides information about the channel between the BS and the SS. The precoder hypothesis tester 546 determines whether a recommended precoder or an alternate precoder (known to both the BS 502 and the SS 542) was utilized to encode a received transmission by, for example, determining a signal (performance) metric for a designated portion of the received signal using both the recommended and alternate precoders. The signal metric may be, for example, a signal-to-noise ratio (SNR) or a signal-to-interference and noise ratio (SINR). In this case, which of the precoders was utilized by the BS 502 is indicated by which of the precoders has a higher associated SNR or SINR. It is contemplated that other signal metrics may be utilized to determine which precoder, among a group of known precoders, was utilized.

The receiver 548, which is coupled to one or more (e.g., one to four) antennas 556 then utilizes the precoder (provided by the precoder hypothesis tester 546) to process an associated received precoded packet. As is shown, the receiver 548 is coupled to a channel estimator 550, which estimates a channel quality of a received signal and provides channel or subchannel estimations to the precoder selector 554, which selects a recommended precoder or a CVQ from the CB 552 responsive thereto. The precoder selector 554 also feeds back preceding information (which may be in the form of a CB index) to the scheduler 504 (of the BS 502) in, for example, a protocol dependent location in an assigned uplink (UL) to indicate a recommended precoder. The scheduler 504 may perform scheduling for multiple BSs and, in this case, the scheduler 504 may take the form of a network scheduler that is independent of a BS.

Figure 6:
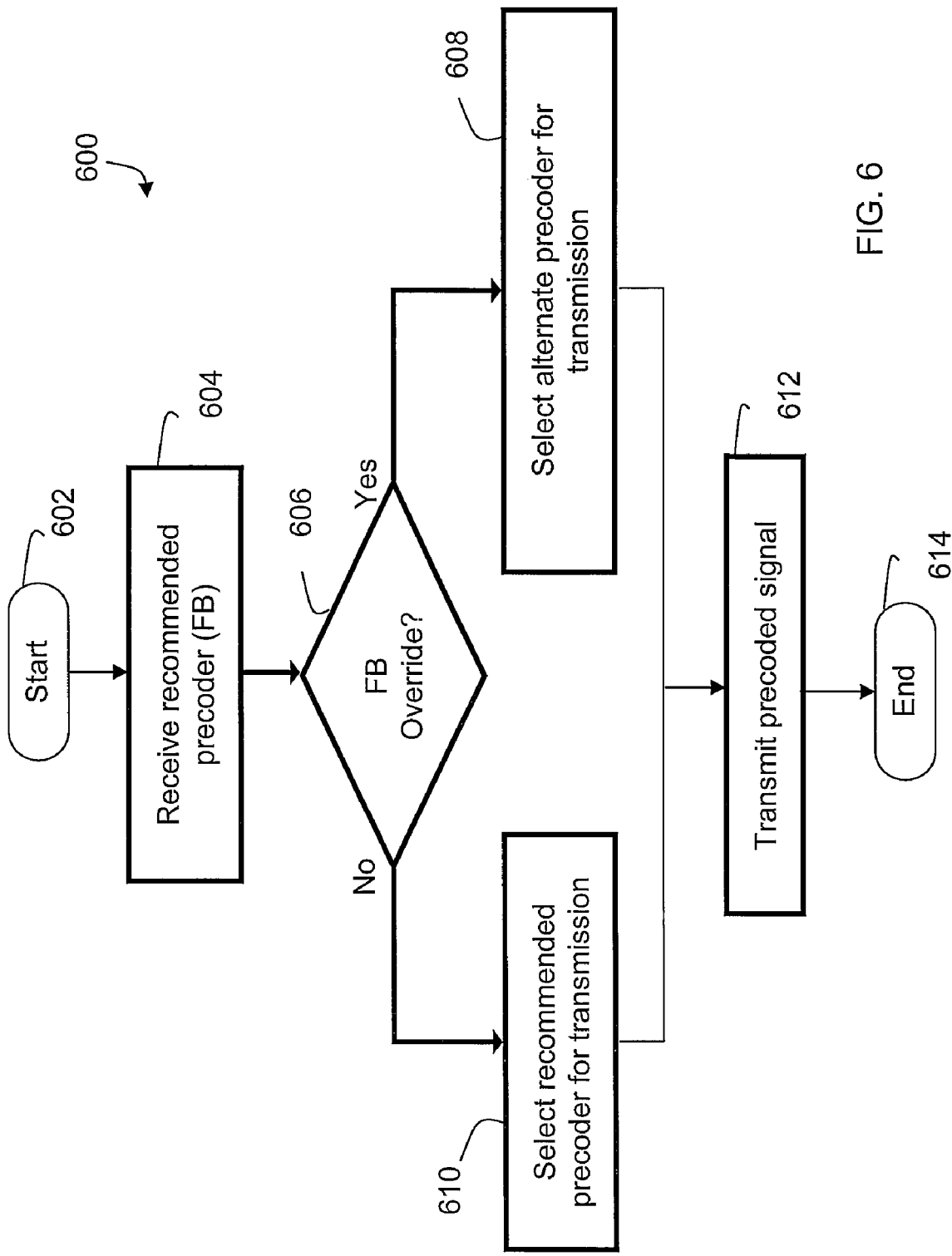
FIG. 6 is a flowchart of an example process employed at a BS of a single-user MIMO wireless communication system, configured according to one aspect of the present disclosure, that does not feed-forward preceding information to a served SS.

With reference to FIG. 6, a flowchart of a process 600, which is employed in a transmitter of a single-user MIMO wireless communication system, is depicted. In contrast to prior art processes, the process 600 does not feed-forward preceding information to a receiver. To aid in understanding, the processes of FIGS. 6-9 are discussed in conjunction with the system 500 of FIG. 5. In block 602, the process 600 is initiated, at which point control transfers to block 604, where the BS 502 receives feedback (FB), which corresponds to a CB index of a recommended precoder, from the SS 542. In a typical case, the SS 542 has performed channel estimation to select the recommended precoder. Next, in decision block 606, the BS 502 determines whether to override the recommended precoder. The BS 502 may, for example, override the recommended precoder when a channel quality between the BS 502 and the SS 542 has experienced a given number of errors (e.g., indicated by non-acknowledgements (NACKs)) within a predetermined time period or when a cyclic redundancy check (CRC) of an uplink transmission (that includes the recommended precoder information) from the SS 542 indicates an error.

When the BS 502 decides to override the FB in block 606, control transfers to block 608, where an alternate precoder (known to the SS 542) is selected (from, for example, the BS precoder CB 506) by the BS 502 for a precoded packet transmission. In block 606, when the BS 502 decides not to override the FB, control transfers to block 610 where the recommended precoder is selected for an allocated portion of the transmission. Following blocks 608 and 610, control transfers to block 612 where the BS 502 transmits the precoded signal to the SS 542 in a DL subframe. Following block 612, control transfers to block 614 where control returns to a calling routine.

Figure 7:
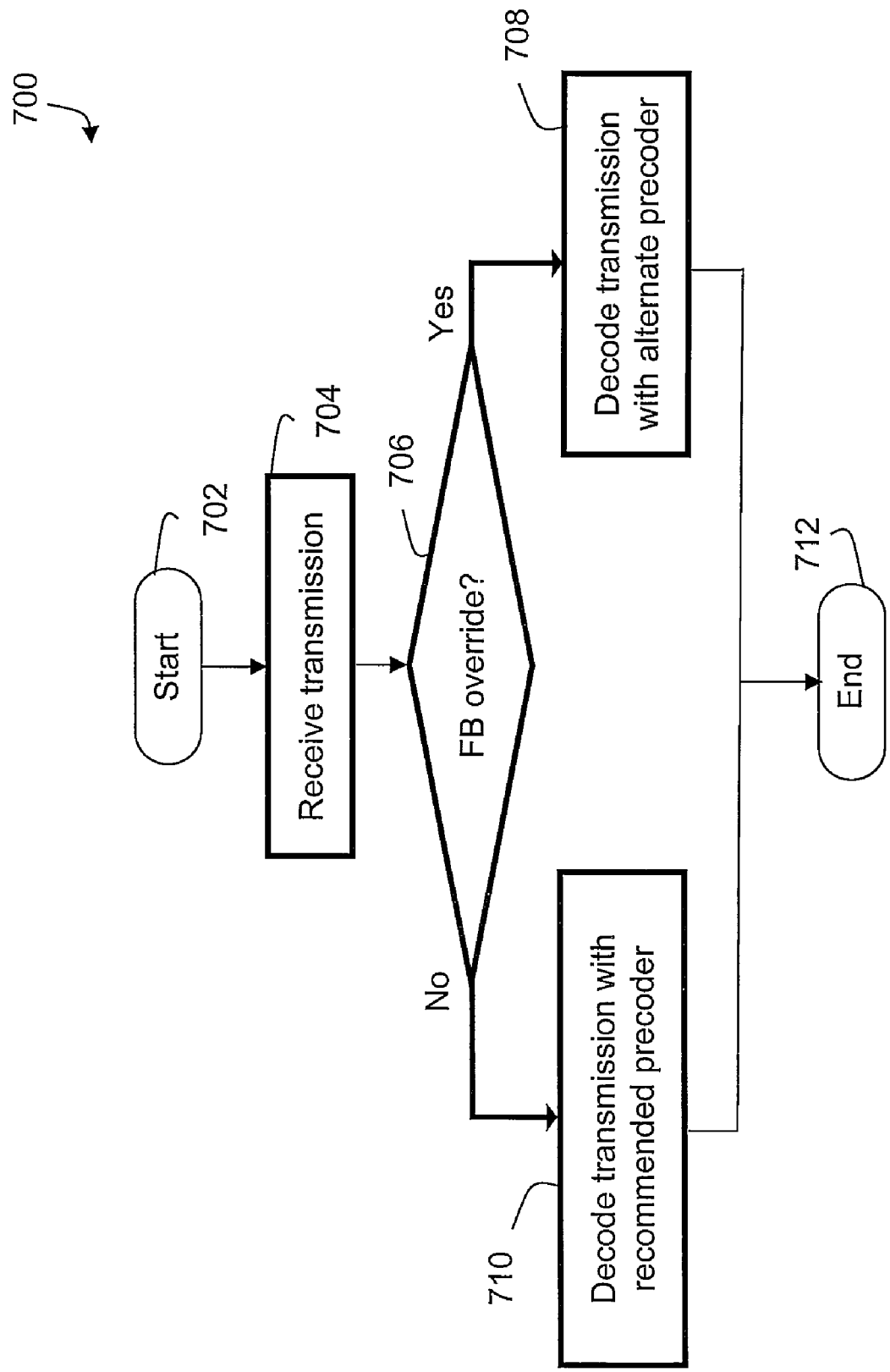
FIG. 7 is a flowchart of an example process employed at an SS of a single-user MIMO wireless communication system, configured according to another aspect of the present disclosure, that identifies a precoder utilized by a serving BS without receiving feed-forward precoding information from the serving BS.

With reference to FIG. 7, a flowchart of a process 700, which is employed in an SS of a wireless communication system configured in a single-user MIMO mode, is depicted. The SS 542, when implementing the process 700, does not receive or utilize feed-forward (FF) preceding information from the BS 502. In block 702, the process 700 is initiated, at which point control transfers to block 704, where the SS 542 receives a transmission from the BS 502. Next, in decision block 706, the SS 542 performs hypothesis testing on a selected portion (e.g., MIMO data) of the transmission to identify a precoder utilized with the selected portion of the transmission and to determine whether the FB to the BS was overridden. As noted above, the identified precoder may correspond to the precoder that provides a highest signal metric. When the identified precoder corresponds to the alternate precoder, control transfers from block 706 to block 708. In block 708, a transmitted packet is decoded with the alternate precoder (which may correspond to an identity matrix). When the identified precoder corresponds to the recommended precoder, control transfers from block 706 to block 710. In block 710, the transmitted packet is decoded with the recommended precoder. Following blocks 708 and 710, control transfers to block 712 where control returns to a calling routine.

Figure 8:
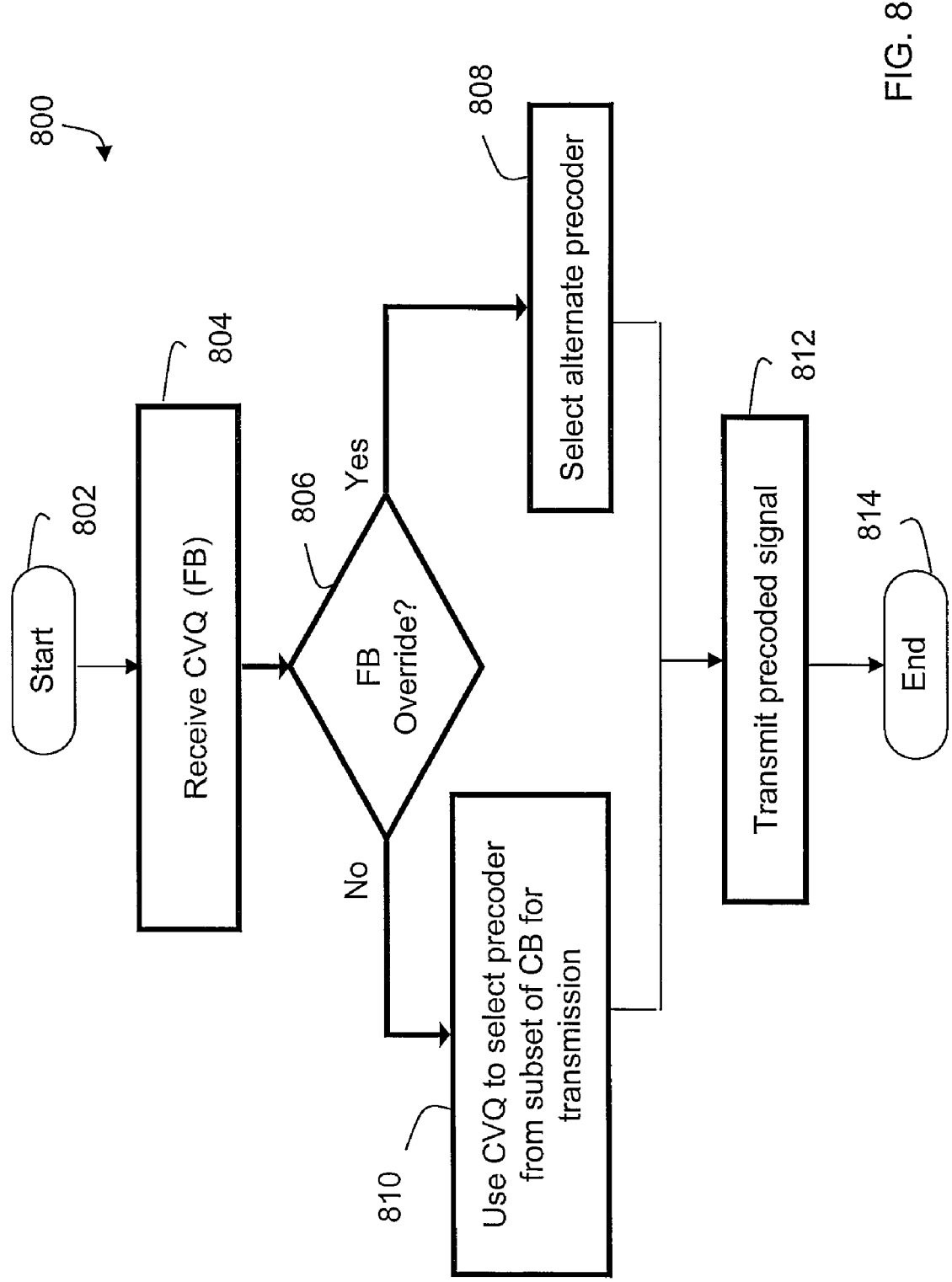
FIG. 8 is a flowchart of an example process employed at a BS of a multi-user MIMO wireless communication system, configured according to one aspect of the present disclosure, that does not feed-forward precoding information to a served SS.

With reference to FIG. 8, a flowchart of a process 800, which is, in one embodiment, employed in a BS of a multi-user MIMO wireless communication system, is depicted. The process 800, similar to the process 600, does not feed-forward precoding information to the SS 542. In block 802 the process 800 is initiated, at which point control transfers to block 804 where the BS 502 receives feedback (FB), which corresponds to a CVQ CB index, from the SS 542. In a typical case, the SS 542 has estimated a channel to determine the recommended CVQ CB index. Next, in decision block 806, the BS 502 determines whether to override the FB provided by the SS 542. The BS 502 may, for example, override the CVQ CB index when a channel quality between the BS 502 and the SS 542 has experienced a given number of errors (e.g., indicated by non-acknowledgements (NACKs)) within a predetermined time period or when a cyclic redundancy check (CRC) of an uplink transmission (that includes the CVQ CB index) from the SS 542 indicates an error.

When the BS 502 decides to override the FB in block 806, control transfers to block 808. In block 808, an alternate precoder is selected (from the BS precoder CB 506) by the BS 502 for a transmission. In block 806, when the BS 502 decides not to override the FB, control transfers to block 810 where the BS 502 uses the CVQ CB index to choose a precoder from a subset of precoders (which may include one or more precoders depending on the system configuration) indicated by the CVQ CB index for the transmission. Following blocks 808 and 810, control transfers to block 812 where the precoded signal is transmitted from the BS 502 to the SS 542. Next, control transfers from block 812 to block 814 where control returns to a calling routine.

Figure 9:
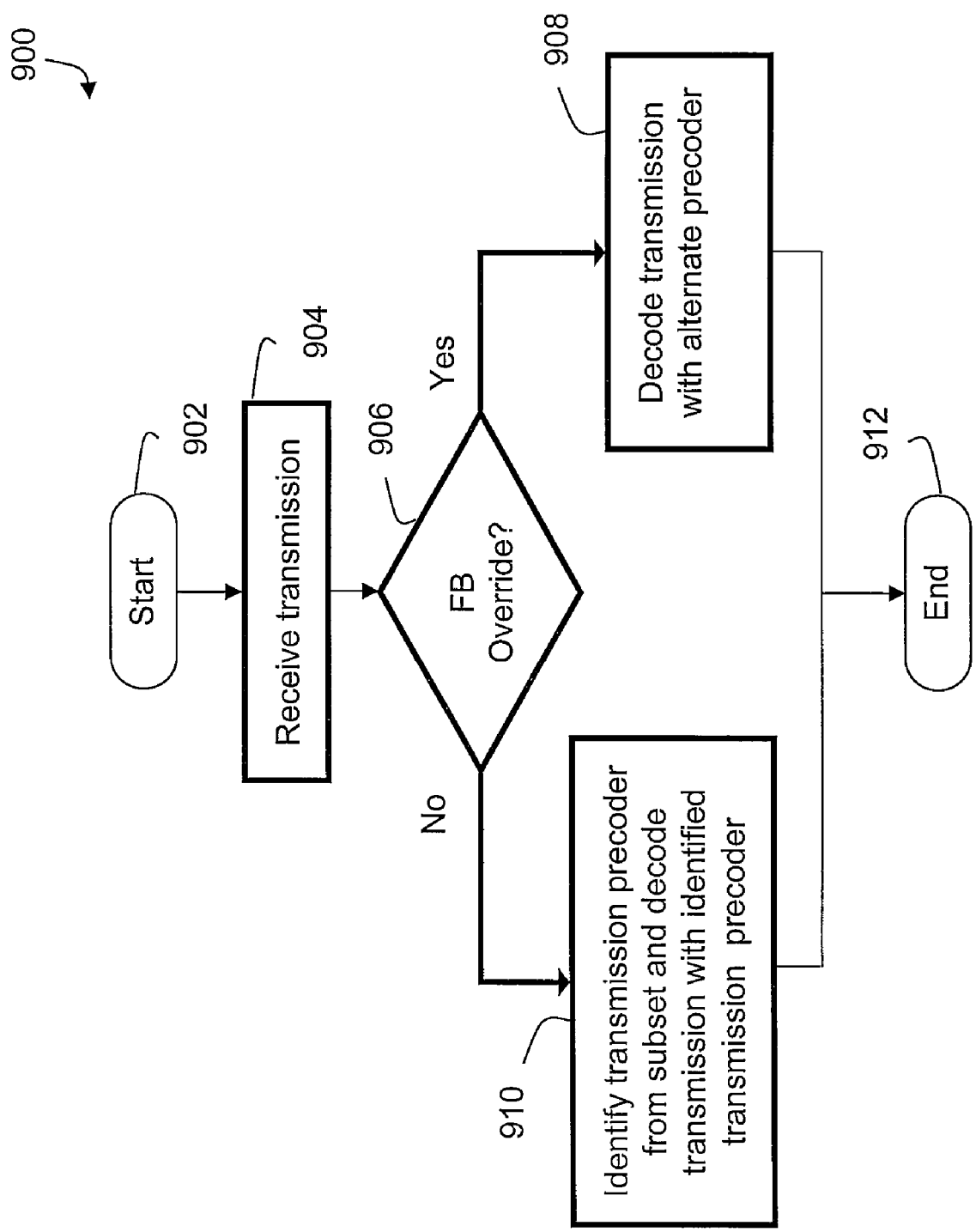
FIG. 9 is a flowchart of an example process, employed at an SS of a multi-user MIMO wireless communication system, configured according to another aspect of the present disclosure, that identifies a precoder utilized by a serving BS without receiving feed-forward precoding information from the serving BS.

With reference to FIG. 9, a flowchart of a process 900 is illustrated that may be employed in the SS 542 when the system 500 is configured in one embodiment of a multi-user MIMO mode. Similar to the process 700 of FIG. 7, the process 900 does not receive fed-forward precoding information from the BS 502. In block 902, the process 900 is initiated, at which point control transfers to block 904, where the SS 542 receives a transmission from the BS 502. Next, in block 906, the SS 542 identifies a precoder associated with the transmission using, for example, hypothesis testing on an appropriate portion of the transmission. When the hypothesis testing indicates an alternate precoder has been utilized by the BS 502, control transfers to block 908 where the transmission is decoded using the alternate precoder. When the hypothesis testing indicates that FB was utilized by the BS 502 to select a precoder, the hypothesis testing is used to determine which precoder of a subset of precoders was utilized for precoding. The identified precoder with the best signal metric is then used to decode associated precoded packets in the transmission. Following blocks 908 and 910, control transfers to block 912 where control returns to a calling routine.

Due to the fact that the BS infrequently overrides the recommended precoder, any performance loss is usually relatively small. In general, the override mechanism is known both to the BS and the SS (a priori) and, thus, feed-forward signaling is implicit. According to this approach, a BS transmits a multi-user MIMO data stream with the alternate precoder in the override case. In general, each SS is configured to decode MIMO control information (or other designated control information). The SS is also configured to detect the transmission precoder assuming the possibility of override with the alternate precoder. The transmission decoder is then utilized to decode assigned RBs. It should be appreciated that the alternate precoder and the recommended precoder or the multiple recommended precoders are known to both the transmitter and the receiver.

To reiterate, the disclosed techniques reduce precoding overhead by not feeding forward precoding information from a BS to an SS, or more broadly from a transmitter to a receiver. As compared to known techniques for signaling preceding information from a BS to an SS, the techniques disclosed herein reduce preceding overhead by at least one bit for each MIMO precoded packet (e.g., a MIMO RB or group of MIMO RBs), albeit at the cost of slightly increased complexity in the SS. In general, the increased complexity is attributable to hypothesis testing of multiple known precoders (e.g., multiple precoders associated with a recommended precoder and an alternate precoder) that may have been utilized by a serving BS in transmission preceding. In one or more embodiments, the alternate precoder may take the form of an identity matrix, which equates to an open loop system where a serving BS is not receiving any feedback (as to a recommended precoder) from a served SS.

With reference to FIG. 10, an example wireless communication system 1000 is depicted that includes a plurality of wireless devices (subscriber stations) 1002, e.g., hand-held computers, personal digital assistants (PDAs), cellular telephones, etc., that may be configured to perform hypothesis testing to determine a precoder used by a transmitter to encode assigned resource blocks (RBs) according to the present disclosure. In general, the wireless devices 1002 include a processor 1008 (e.g., a digital signal processor (DSP)) that employs a software system, a transceiver 1006, and one or more input/output devices 1004 (e.g., a camera, a keypad, display, etc.), among other components not shown in FIG. 10.

As is noted above, according to various embodiments of the present disclosure, techniques are employed to reduce precoding overhead associated with preceding packets (e.g., RBs) for a wireless communication device, such as the wireless devices 1002. The wireless devices 1002 communicate with a base station controller (BSC) 1012 of a base station subsystem (BSS) 1010, via one or more base transceiver stations (BTS) 1014, to receive or transmit voice, data, or both voice and data. The BSC 1012 may, for example, be configured to schedule communications for the wireless devices 1002. Alternatively, the BTS 1014 may schedule communications for the wireless devices 1002 in which the BTS 1014 is in communication. In either case, a scheduler typically employs one or more processors (that execute a software system) to schedule communications.

The BSC 1012 is also in communication with a packet control unit (PCU) 1016, which is in communication with a serving general packet radio service (GPRS) support node (SGSN) 1022. The SGSN 1022 is in communication with a gateway GPRS support node (GGSN) 1024, both of which are included within a GPRS core network 1020. The GGSN 1024 provides access to computer(s) 1026 coupled to Internet/intranet 1028. In this manner, the wireless devices 1002 may receive data from and/or transmit data to computers coupled to the Internet/intranet 1028. For example, when the devices 1002 include a camera, images may be transferred to a computer 1026 coupled to the Internet/intranet 1028 or to another one of the devices 1002. The BSC 1012 is also in communication with a mobile switching center/visitor location register (MSC/VLR) 1034, which is in communication with a home location register (HLR), an authentication center (AUC), and an equipment identity register (EIR) 1032. In a typical implementation, the MSC/VLR 1034 and the HLR, AUC, and EIR 1032 are located within a network and switching subsystem (NSS) 1030, which may also perform scheduling for the system 1000. The SGSN 1022 may communicate directly with the HLR, AUC and EIR 1032. As is also shown, the MSC/VLR 1034 is in communication with a public switched telephone network (PSTN) 1042, which facilitates communication between wireless devices 1002 and land telephones 1040. It should be appreciated that other types of wireless systems, having different configurations, may implement various aspects of the RB preceding techniques disclosed herein.

Accordingly, a number of techniques have been disclosed herein that generally reduce preceding overhead in a multiple-input multiple-output wireless communication system. It is contemplated that the techniques described herein may be advantageously employed in wireless communication systems that comply with a number of different standards.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. For example, scheduling software that implements the process 600 of FIG. 6 or the process 800 of FIG. 8 may be stored at a scheduler (located at the BSC 1012 or the BTS 1014 of FIG. 10). As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present disclosure with appropriate standard computer hardware to execute the code contained therein. An apparatus for practicing the techniques of the present disclosure could be one or more computers and storage systems containing or having network access to computer program(s) coded in accordance with the present disclosure.

Although the invention is described herein with reference to specific embodiments, various modifications and changes can be made without departing from the scope of the present invention as set forth in the claims below. For example, the precoding techniques disclosed herein are generally broadly applicable to transmitters and receivers, irrespective of location, in wireless communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of operating a wireless communication device in a multiple-input multiple-output wireless communication system, comprising:
    receiving, at a first wireless communication device, recommended precoder information from a second wireless communication device, wherein the recommended precoder information is associated with a recommended precoder;
    forming, at the first wireless communication device, a precoded signal based on the recommended precoder or an alternate precoder; and
    transmitting, from the first wireless communication device, the precoded signal to the second wireless communication device, wherein the first wireless communication device is configured to not provide an indication of whether the recommended precoder or the alternate precoder was utilized to form the precoded signal, wherein the alternate precoder corresponds to an identity matrix.

2. The method of claim 1, where the forming further comprises:
    forming, at the first wireless communication device, the precoded signal with the alternate precoder when feedback from the second communication wireless device is received in error.

3. The method of claim 2, where the forming further comprises:
    forming, at the first wireless communication device, the precoded signal with the alternate precoder when a determined number of errors have occurred in one or more transmissions received from the second wireless communication device as indicated by non-acknowledgements within a predetermined time period.

4. The method of claim 1, wherein the multiple-input multiple-output wireless communication system is a single-user multiple-input multiple-output wireless communication system and the recommended precoder information corresponds to a codebook index.

5. The method of claim 4, further comprising:
    selecting a desired precoding codeword from a codebook based on the codebook index.

6. The method of claim 1, wherein the recommended precoder information corresponds to a desired precoding codeword.

7. The method of claim 1, wherein the multiple-input multiple-output wireless communication system is a multi-user multiple-input multiple-output wireless communication system and the recommended precoder information corresponds to a channel vector quantization.

8. The method of claim 7, further comprising:
    selecting, from a codebook, a desired precoding codeword from a subset of precoding codewords based on the channel vector quantization.

9. A wireless communication system, comprising:
    a subscriber station; and
    a base station in communication with the subscriber station, wherein the base station is configured to:

receive, from the subscriber station, recommended precoder information, wherein the recommended precoder information is associated with a recommended precoder;

form a precoded signal based on the recommended precoder or an alternate precoder; and transmit, to the subscriber station, the precoded signal, wherein the base station is configured to not provide an indication of whether the recommended precoder or the alternate precoder was utilized to form the precoded signal, wherein the alternate precoder corresponds to an identity matrix.

10. The wireless communication system of claim 9, wherein the multiple-input multiple-output wireless communication system is a single-user multiple-input multiple-output wireless communication system and the recommended precoder information corresponds to a codebook index or a desired precoder.

11. The wireless communication system of claim 9, wherein the multiple-input multiple-output wireless communication system is a multi-user multiple-input multiple-output wireless communication system and the recommended precoder information corresponds to a channel vector quantization.

12. The wireless communication system of claim 9, wherein the subscriber station is configured to:

receive the precoded signal; and hypothesis test the precoded signal to determine whether the recommended precoder or the alternate precoder was utilized in forming the precoded signal based on a signal metric.

13. The wireless communication system of claim 12, wherein the recommended precoder includes multiple recommended precoders and the subscriber station is further configured to:

determine whether the alternate precoder or one of the multiple recommended precoders was utilized in forming the precoded signal based on the signal metric, wherein the signal metric includes at least one of a signal-to-noise ratio or a signal-to-interference and noise ratio.

* * * * *